US006832225B1

(12) United States Patent
Henry et al.

(10) Patent No.: US 6,832,225 B1
(45) Date of Patent: Dec. 14, 2004

(54) METHOD AND DEVICE FOR RECORDING AND SEARCHING FOR A DOCUMENT ON A COMMUNICATION NETWORK

(75) Inventors: Félix Henry, Rennes (FR); Jean-Jacques Moreau, Rennes (FR)

(73) Assignee: Canon Research Centre France S.A. (FR)

( * ) Notice: Subject to any disclaimer, the term of this patent is extended or adjusted under 35 U.S.C. 154(b) by 0 days.

(21) Appl. No.: 09/453,587

(22) Filed: Dec. 3, 1999

(30) Foreign Application Priority Data

Dec. 14, 1998 (FR) ............................................ 98 15752

(51) Int. Cl.⁷ ................................................ G06F 7/00
(52) U.S. Cl. ..................................................... 707/101
(58) Field of Search .............................. 341/50–54, 95, 341/55, 106; 382/238, 239, 251; 375/240.1–240.3; 365/44, 49; 707/9, 1, 101, 102, 104.1, 10, 201, 203

(56) References Cited

U.S. PATENT DOCUMENTS

| | | | | |
|---|---|---|---|---|
| 4,907,194 A | * | 3/1990 | Yamada et al. | ............... 365/49 |
| 5,231,593 A | | 7/1993 | Notess | ...................... 364/550 |
| 5,243,543 A | | 9/1993 | Notess | ...................... 364/550 |
| 5,247,357 A | * | 9/1993 | Israelsen | ............... 375/240.12 |
| 5,251,152 A | | 10/1993 | Notess | ...................... 364/550 |
| 5,745,686 A | | 4/1998 | Saito et al. | ........... 395/200.15 |
| 5,765,152 A | * | 6/1998 | Erickson | ....................... 707/9 |
| 6,031,939 A | * | 2/2000 | Gilbert et al. | .............. 382/239 |
| 6,215,422 B1 | * | 4/2001 | Henry et al. | .................. 341/51 |

FOREIGN PATENT DOCUMENTS

EP     0843 269 A2    5/1998

OTHER PUBLICATIONS

Welch, Terry A., "A Technical High–Performance Data Compression", IEEE Computer, vol. 17, No. 6, Jun. 1984.

Yuwono, B., et al., "Search and Ranking Algorithms for Locating Resources on the World Wide Web", Proceedings of the Twelfth International Conference on Data Engineering, New Orleans, Feb. 26–Mar. 1, 1996, no. Conf. 12, Feb. 26, 1996, pps. 164–171.

Davies, N.J., et al., "Information Agents for The World Wide Web", BT Technology Journal, vol. 14, No. 4, Oct. 1, 1996, pp. 105–114.

Tauscher, L., et al., "How People Revisit Web Pages: Empirical Findings and Implications for the Design of History Systems", International Journal of Human–Computer Studies, vol. 47, No. 1, Jul. 1997, pp. 97–137.

* cited by examiner

Primary Examiner—Uyen Le
Assistant Examiner—Te Yu Chen
(74) Attorney, Agent, or Firm—Fitzpatrick, Cella, Harper & Scinto

(57) ABSTRACT

A system for recording information relating to a document, which is accessible via a computer communication network, operates by extracting key words associated with the document, associating a binary code with each extracted key word to form associations, storing the associations in a dictionary, and storing an electronic address (URL) of the document and the binary codes in association with each other in an information storage unit of a user.

52 Claims, 10 Drawing Sheets

METHOD AND DEVICE FOR RECORDING AND SEARCHING FOR A DOCUMENT ON A COMMUNICATION NETWORK

The present invention concerns a method of recording information relating to a document visited by a user of a computer communication network.

It also concerns a method of searching for a document on a computer communication network from information recorded by means of the recording method according to the invention.

Correlatively, the present invention concerns a recording device and a search device adapted respectively to implement the recording method and searching method according to the invention.

The present invention fits more generally within the field of computer communication networks which make it possible to transfer documents between computer servers storing electronic documents, and one or more users able to surf the network by means of a browser.

In communication networks, a multitude of computers and peripherals are connected. The peripherals can, by way of example, be printers, storage units, or means of acquiring or storing documents. The computers and peripherals in a network can in turn be computer servers or clients on the communication network.

The documents exchanged are of very varied natures: texts, images, videos, sound, computer programs, etc.

Given the size and complexity of a wide area network, the user cannot surf it completely in order to seek information. This is notably the case with the World Wide Web, built on top of the Internet.

Search tools have been set up to facilitate this search. They generally make it possible, using an indexing of the documents stored, to make searches by key words. However, the results are very often so large in number that they make it very difficult to use them.

In addition, when the user has in the past found a document liable to meet the object of his search, it will be highly advantageous to him to attempt to find this document again using the history of his browser.

This is because the history of a browser can contain information such as the title of documents visited and their electronic address on the communication network.

However, when the history contains many entries, the search is tedious, all the entries having to be examined one after another. In addition, the title stored can be deceptive with regard to the exact content of the document. Moreover, the storage of the entries in the history is limited in time in order to limit the space needed for storing the history.

The aim of the present invention is to propose a method of recording information which makes it possible to store, in reduced form, documents visited by the user, and an associated search method which then enables the user to find a document visited in the past.

In accordance with the invention, a method of recording information relating to a document visited by a user of a computer communication network is characterised in that it includes the following steps:

extracting key words associated with said visited document;

associating a binary code with each extracted key word;

storing said associations in a dictionary; and storing said binary codes associated with the electronic address of the document on the computer communication network in information storage means of the user.

Correlatively, the present invention also concerns a device for the recording of information relating to a document visited by a user of a computer communication network, characterised in that it has:

means of extracting key words associated with said visited document;

means of associating a binary code with each extracted key word;

a dictionary for storing said associations; and information storage means adapted to store said binary codes associated with the electronic address of the document on the computer communication network.

Thus, by reducing each document visited to a certain number of key words, compressing these by means of a binary coding and storing the result of this compression, it is possible to store locally, in reduced form, a very large number of documents visited by the user.

According to a preferred characteristic of the invention, the step of associating a binary code with a key word comprises the following substeps:

checking the existence or not of said key word in the dictionary;

in the negative, creating a new binary code; or in the affirmative, reading the binary code associated with said key word in the dictionary.

Generating the dictionary as new key words are extracted from documents visited by the user makes it possible to create a dictionary peculiar to each user and to limit the size thereof solely to the key words extracted locally.

According to an advantageous characteristic of the invention, particularly simple to implement, the binary codes of the dictionary are fixed-length codes.

Alternatively, the binary codes are variable-length codes, thus making it possible take account of the frequency of appearance of a key word when it is coded in order to limit still further the space necessary for storing the binary codes in the information storage means.

According to a preferred characteristic of the invention, the binary codes have a length of M bits determined according to a maximum number $2^M$ of associations stored in the dictionary and, at the step of creating a new binary code, if the number of associations stored in the dictionary is greater than said maximum number $2^M$, the binary codes of the dictionary are reconstructed on binary codes of length M+1.

The size of the binary codes is thus adapted in real time to the increasing number of key words which have to be stored in the dictionary associated with the user.

Preferably, in order to limit still further the space necessary for storage of the dictionary, the associations of key words and binary codes stored in the dictionary are compressed by an entropic coding method.

According to another preferred version of the invention, the information storage means are incorporated in the history of a browser of the user.

Thus it suffices to add a supplementary field to the existing history in order to store the binary codes associated with the key words of each document.

This arrangement affords a saving in space, avoiding notably storing in independent information storage means the electronic addresses of the visited documents already stored conventionally in the history of the browser of the user.

According to a preferred embodiment of the invention, the recording method also comprises a step of storing, in the information storage means, an authentication signature associated with the document.

The storage of this authentication signature, obtained for example by means of a Cyclical Redundancy Check CRC algorithm, makes it possible to check subsequently whether the content of a document at a given electronic address has or has not been modified.

Thus, still according to this preferred embodiment, the recording method also includes the following prior steps:

checking the existence or not of the electronic address of the document visited in the information storage means of the user;

in the affirmative, calculating the authentication signature associated with the document visited;

comparing the calculated authentication signature and the stored authentication signature in the information storage means; and reiterating the steps of extracting key words, associating a binary code, storing said associations, storing said binary codes and storing the calculated authentication signature in the information storage means of the user when the calculated and stored authentication signatures are different.

Thus, each time the user once again visits a given document, the different steps of the recording method are implemented only if the content of this document has been modified since the last storage of its electronic address associated with a certain number of key words in the information storage means of the user.

According to another preferred characteristic of the invention, the step of extracting the key words comprises the following steps:

determining the format of the document;

eliminating, in said document, one or more commands from a list of commands to be eliminated for a given format;

determining the language of the document;

eliminating, in said document, a series of common words using a list of common words to be eliminated for a given language;

eliminating, in the document, a series of terminations from a list of terminations to be eliminated for a given language;

making uniform the format of writing the words of the document; and eliminating doubles in said document.

This extraction step makes it possible to condense a document, such as text, into a series of key words which are significant with respect to the content of the document.

According to another advantageous characteristic of the invention, which then facilitates a search using binary codes on the stored documents, the recording method also includes a step of indexing the electronic addresses of the documents by means of binary codes in the information storage means of the user.

The recording device according to the invention has characteristics and advantages identical to those previously disclosed for the recording method, these advantages not being disclosed again here.

The present invention also concerns a method of searching, by a user, for a document on the computer communication network from information recorded by the recording method according to the invention, characterised in that it comprises the following steps:

supplying a search criterion containing at least one key word by the user;

reading, in the dictionary, the binary code associated with the key word if such exists;

extracting, from the information storage means, the electronic address of the document or documents associated with the binary code read;

downloading the document or documents if such exist.

Correlatively, a device for the seeking, by a user, of a document on the computer communication network using information recorded by a recording device according to the invention, is characterised in that it has:

means of supplying a search criterion containing at least one key word by the user;

means of reading, in the dictionary, the binary code associated with the key word;

means of extracting, from the information storage means, the computer address of the document or documents associated with the binary code read;

means of downloading the document or documents.

This search method thus enables the user to find once again, amongst the documents to which he has already gained access, those which are able to meet certain criteria, such as, for example, the presence of key words.

The user can thus easily find again a document already displayed using the information which it contains rather than only from a title or an electronic address, which do not directly give information on the content of the document.

In addition, this search being performed locally, at the level of each user of the communication network, it does not depend on the load on the communication network nor the rate of the communication links.

The search is also carried out on a lesser number of documents than those stored on the communication network and the results can thus be obtained more rapidly.

According to a preferred characteristic of the invention, the search criterion containing several key words, the search method also includes a step of filtering the extracted electronic address or addresses, including the following substeps:

comparing the number of binary codes read associated with the extracted electronic address or addresses with a threshold value; and eliminating the electronic address or addresses associated with a number of binary codes lower than said threshold value.

This filtering step makes it possible to limit the number of documents downloaded to the documents associated with a minimum number of key words of the search criterion.

According to a preferred embodiment of the invention, when the recording method comprises a step of storing an authentication signature associated with the document, the search method also comprises a step of updating the information storage means comprising the following substeps:

eliminating, in the information storage means, the document or documents which no longer exist at the associated electronic address;

calculating the authentication signature of the downloaded document or documents;

comparing the calculated authentication signature and the stored authentication signature in the information storage means; and reiterating the steps of extracting key words, associating a binary code, storing said associations, storing said binary codes and storing the calculated authentication signature of said recording method when the calculated and stored authentication signatures are different.

This updating makes it possible to eliminate, in the information storage means, the documents no longer existing on the communication network and to update the binary codes associated with the documents when the content of the latter has been modified.

According to one advantageous characteristic of the invention, which makes it possible to search effectively for documents dealing with a subject, the search criterion comprises a regular expression of key words.

The search device according to the invention has characteristics and advantages identical to those previously disclosed for the search method, these advantages not being disclosed again here.

In a practical manner, the recording device according to the invention is incorporated in a microprocessor, a read only memory containing a program for recording information and a random access memory containing registers adapted to record variables modified during the running of the program.

Likewise, the search device according to the invention is incorporated in a microprocessor, a read only memory containing a program for searching for documents and a random access memory containing registers adapted to record variables modified during the running of the program.

An information storage means, possibly partially or totally removable, which can be read by a computer or microprocessor storing instructions of a computer program, is characterised in that it is adapted to implement a recording method and/or a search method in accordance with the invention.

The present invention also concerns a computer, a computer server and a communication network having means adapted to implement the recording method or the search method according to the invention.

Correlatively, the present invention also concerns a computer, a computer server and a communication network having a recording device or a search device according to the invention.

It also concerns a computer communication network characterised in that it has several computer servers according to the invention, and notably forming a wide area network.

The characteristics and advantages of this information storage means, of this computer, of this computer server and of this communication network being identical to those of the recording and search methods and devices described above, they will not be detailed any further below.

Other particularities and advantages of the invention will also emerge from the following description of a particular embodiment of the invention.

In the accompanying drawings, given by way of non-limitative examples:

The present invention, one embodiment of which will be described below, applies in particular to wide area communication networks. Such a communication network has a very large number of computer servers connected together.

The network can by way of example be a worldwide communication network, such as the internet, built on top of a communication protocol enabling the computers connected to the communication network to exchange documents.

Figure 1:
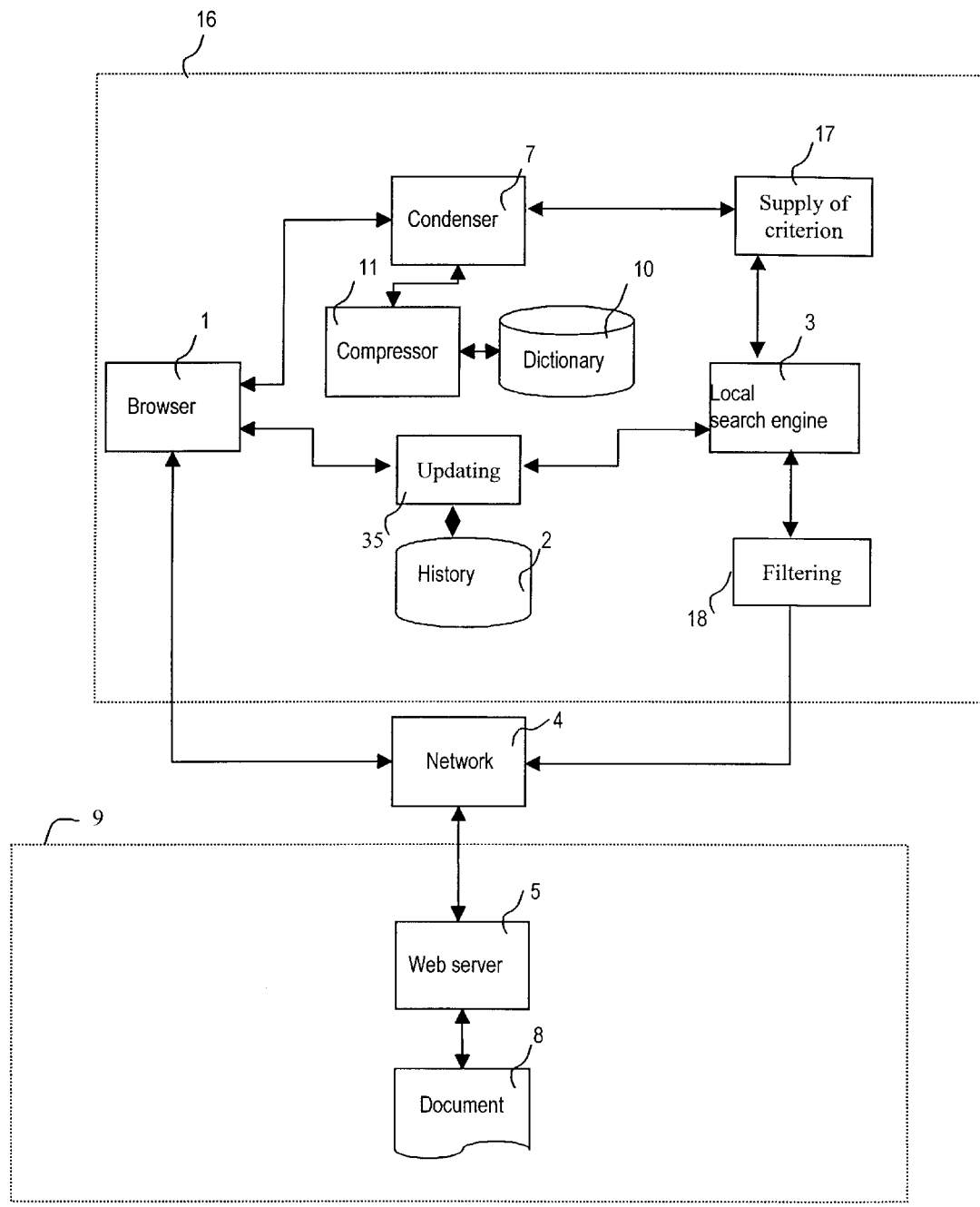
FIG. 1 is a block diagram illustrating a communication network according to one embodiment of the invention.

As illustrated in FIG. 1, the documents are stored at a computer server 9 capable of recovering a document from a memory 8 and serving it by means of the server 5 on the communication network 4 to a user 16.

Each user 16 has in a conventional manner a browser 1 capable of sending computer requests over the communication network 4 to servers 9 for ordering the transfer documents, such as texts, images etc.

Although only one computer server 9 and one user 16 are illustrated in FIG. 1 for reasons of simplification, the communication network 1 is generally connected to numerous computer servers 9 and numerous users 16.

It should also be stated that, throughout the remainder of the description, the concept of user is employed to designate a data processing system such a computer 16 adapted to establish computer requests for ordering a document stored on a computer server 9 and that the latter is adapted to respond to this computer request. On the scale of a communication network, one and the same data processing system such as a computer can alternatively be considered to be a user of the communication network (also referred to as a client) or as a computer server.

An information system, where the information is stored in documents (texts, images, sound etc), is built on top of the communication network.

An example of an information system built on top of the Internet communication network is the WWW (World Wide Web) system, where the communication protocol used can by way of example be the HyperText Transfer Protocol (HTTP).

In this example, the computer 16 of the user has both a recording device and a search device according to the invention.

The recording device makes it possible to locally record information relating to a document listed by the user 16 of the computer communication network 4.

This recording device has extraction means, referred to as a condenser 7 in the remainder of the description, for extracting key words associated with the visited document.

It also has association means, referred to as a compressor 11 in the remainder of the description, for associating a binary code with each extracted key word.

A dictionary 10 stores the associations of key words and binary codes.

In addition, the recording device has information storage means adapted to store the binary codes associated with the electronic address of the document.

In this example embodiment, the information storage means are incorporated in the history 2 associated with the browser 1 of the user 16.

Figure 2:
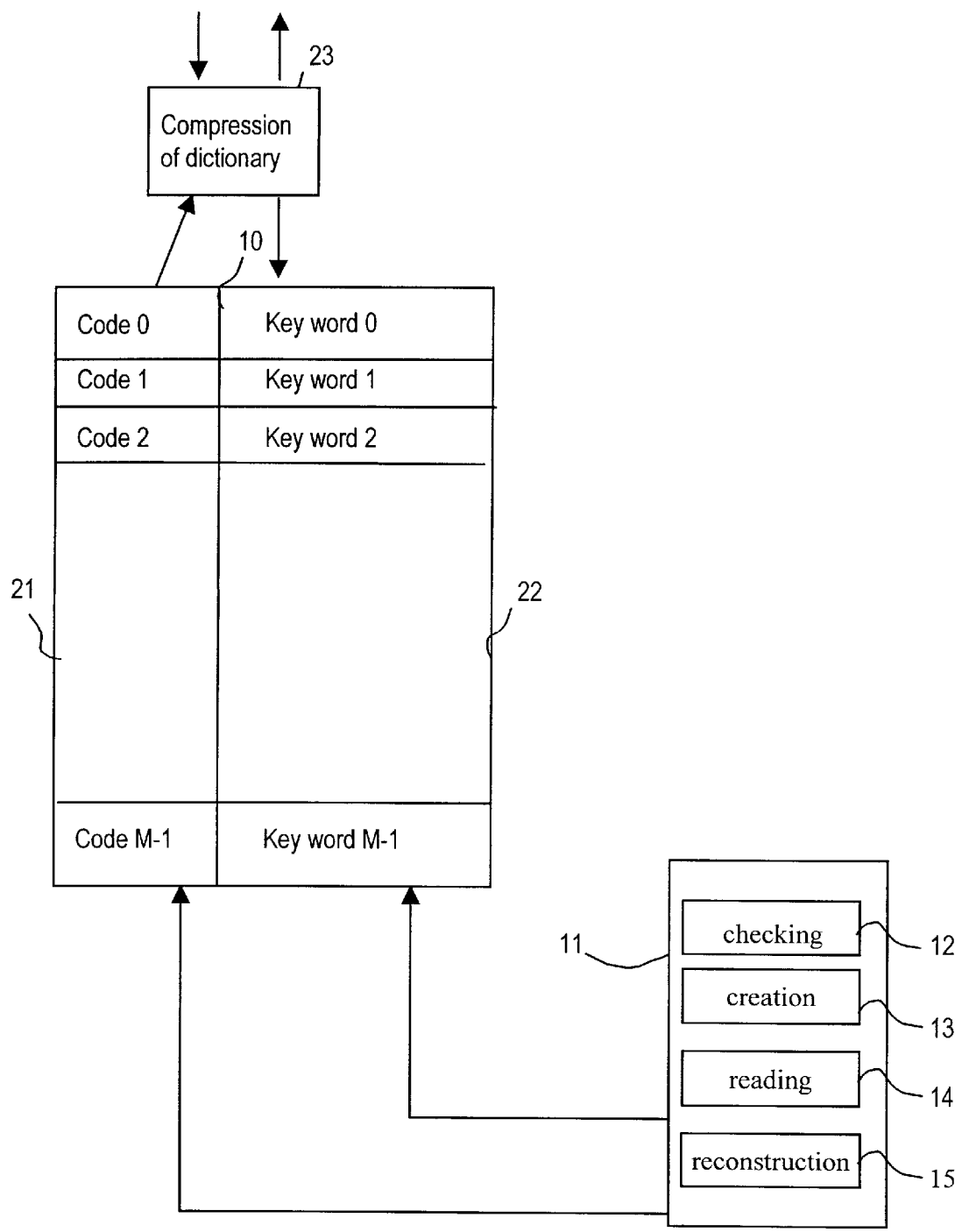
FIG. 2 is a diagram illustrating the construction and updating of a dictionary of a user of the communication network illustrated in FIG. 1.

As illustrated in FIG. 2, the compressor 1 comprises means 12 of checking the existence or not of a key word in the dictionary 10, means 13 of creating new binary code and means 14 of reading a binary code associated with a key word in the dictionary 10.

The dictionary 10 is thus formed by a memory with two registers: a register 21 stores the binary codes, here the codes 0 to M−1, and a register 22 stores the associated key words, here M key words.

The binary codes of the dictionary 10 can be codes of fixed length or codes of variable length. In the latter case, the coding makes it possible to take account of the probability of appearance of the key words in the documents in order to associate a binary code. A Huffman coding can be used in this case.

In general terms, a uniquely readable code corresponds to a unique key word in the dictionary 10.

In this example embodiment, the binary codes have a length of M bits determined as a function of a maximum number $2^M$ of key words stored in the dictionary 10.

The size of the dictionary 10 of each user 16 changes as the number of key words stored increases.

Thus the compressor 11 also comprises means 15 of reconstructing the binary codes of the dictionary 10 which make it possible to reconstruct the binary codes on a different number of bits when the size of the dictionary 10 is modified.

Thus, when the binary codes are represented in M bits, if the number of key words stored in the dictionary 10 becomes greater than the maximum number $2^M$, all the binary codes must be reconstructed on binary codes of length M+1.

Conversely, if key words are eliminated from the dictionary 10 and the number of key words stored in the dictionary 10 becomes less than or equal to $2^{M-1}$, all the binary codes can be reconstructed on binary codes of length M−1 in order to reduce the space necessary for storing these binary codes.

Preferably also, the dictionary 10 itself can be compressed by a normal entropic coding method. Compression means 23 are provided for this purpose.

Figure 3:
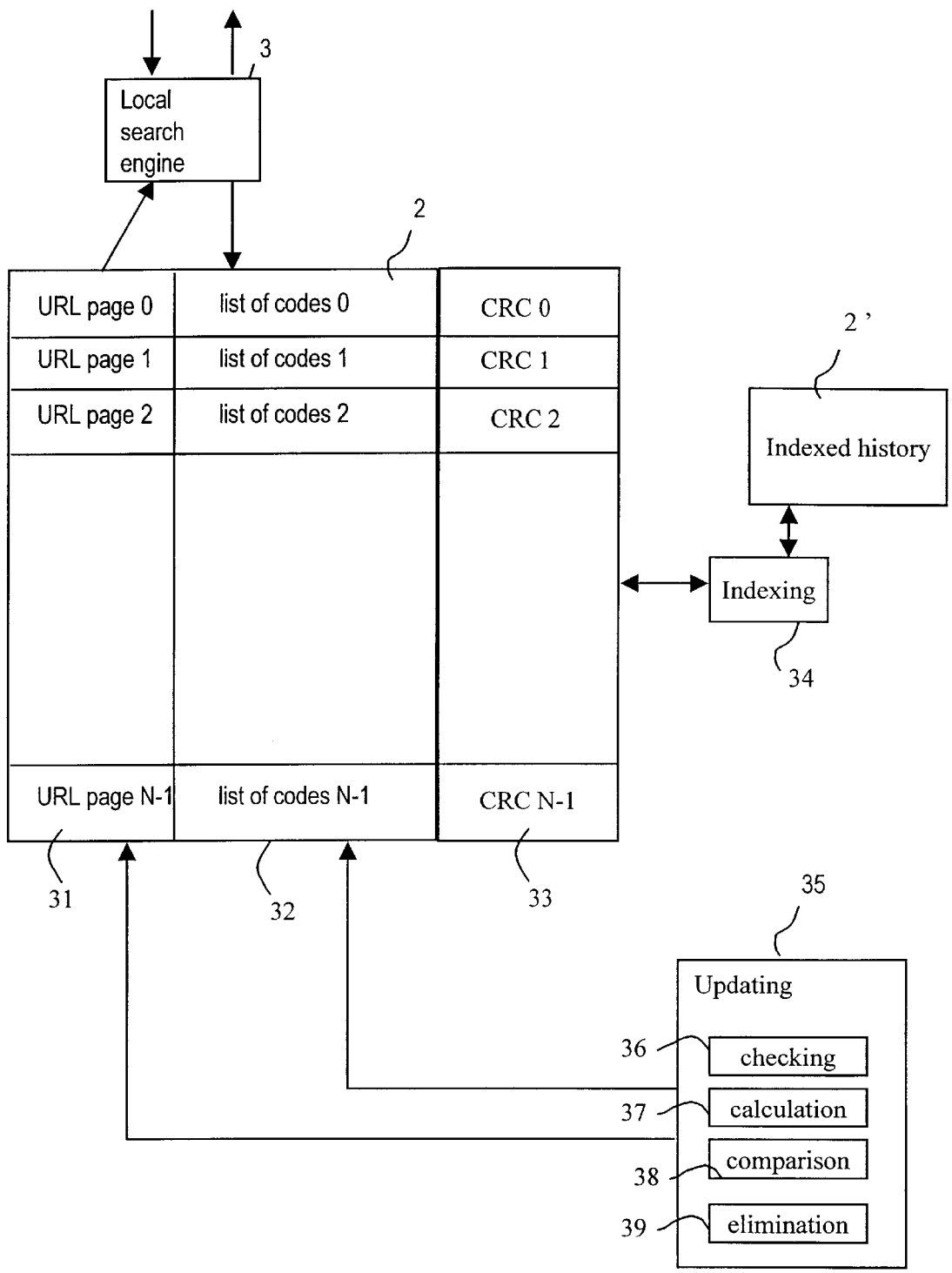
FIG. 3 is a diagram illustrating the construction and updating of a history of a user of the communication network illustrated in FIG. 1.

As illustrated in FIG. 3, the history 2 of the user 1 comprises several registers 31 to 33.

The register 31 makes it possible to store the electronic addresses of the documents on the communication network. These URL (Uniform Resource Locator) addresses make it possible to uniquely reference the documents stored on the different servers of a communication network. Here the history 20 stores N pages of documents respectively by their URL 0 to N−1.

The history 2 also includes a register 32 for storing the list of binary codes associated with each document. Here the register 32 contains N lists of codes, each list containing one or more binary codes associated with each document.

It should be noted that identical binary codes can be stored in different lists since some documents have identical key words.

In this embodiment, the history also has a register 33 adapted to store an authentication signature associated with each document.

This authentication signature can be calculated for each document by means of a Cyclical Redundancy Check algorithm CRC.

In a conventional manner, this algorithm makes it possible to calculate a check number, for example in 32 bits, from the document itself.

The calculation of the CRC signature of the document and its comparison with a CRC signature calculated previously makes it possible to detect any modification to the document over time.

The recording device has for this purpose means 35 of updating the history 2 which comprise:
  means 36 of checking the existence or not of the electronic address URL of a document visited in the history 2 of the user 16;
  means 37 of calculating the CRC authentication signature associated with the visited document; and
  means 38 of comparing the calculated CRC authentication signature and the CRC authentication signature stored in the register 33 of the history 2.

The history 2 can also include other well known registers, not depicted in FIG. 3, for storing for example the title of a document, the date of the first or last visit to the document by the user 16, the number of visits to this document etc.

In addition, in order to facilitate the search for a document by means of a binary code in the history 2, the latter can have means 34 of indexing the electronic addresses of the documents by means of the binary codes.

In this way an indexed history 2' is obtained in which, with each binary code stored in the initial history 2, there is associated a list of documents referenced by their electronic address URL.

In accordance with a second aspect of the invention, a search device enables the user 16 to search in his history for a document which he has visited in the past and which was recorded in reduced form in the history 2.

This search device has means 17 of supplying a search criterion containing at least one key word; means 14 of reading in the dictionary 10 the binary code associated with the key word; and means 3 of extracting from the history 2 the electronic address of the document or documents associated with the binary code read.

In this example, the search device has reading means 14 identical to the reading means 14 of the compressor 11 of the recording device.

The extraction means 3 thus function as a local search engine and make it possible, using the electronic addresses extracted, to download the documents from the computer communication network 4.

Preferably, this search device also has means 18 of filtering the extracted electronic addresses when the search criterion includes several key words.

These filtering means include for example means of comparing, for each document found in the history 2, the number of binary codes read with a threshold value and means of eliminating from the document the request sent over the communication network if the number of binary codes is less than this threshold value.

The search device is in this example incorporated in the recording device and cooperates in particular with the means 35 for updating the history 2. It also has, integrated into the updating means 35, means 39 of eliminating from the history 2 the document or documents not received by downloading means 3 of the local search engine.

Figure 4:
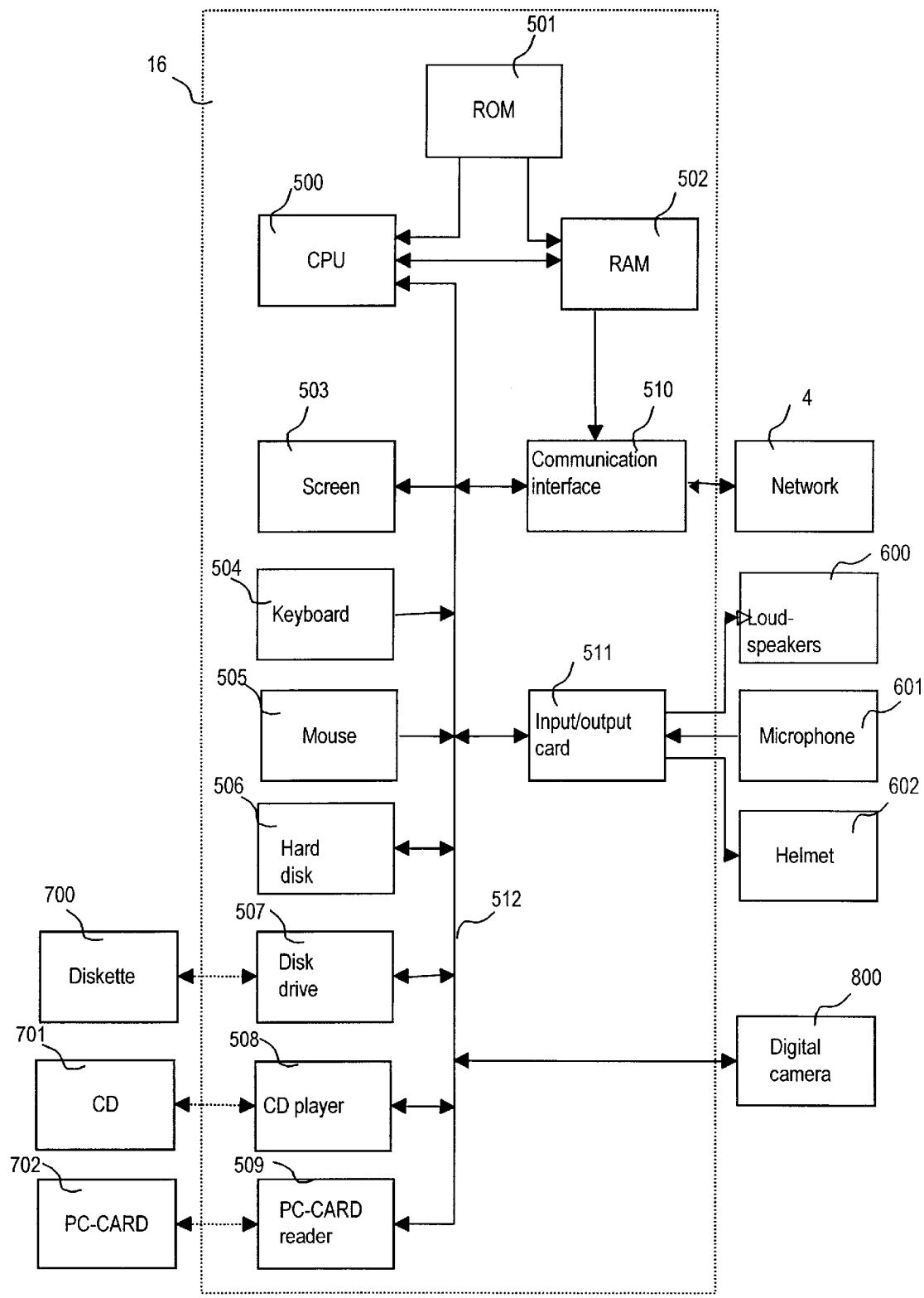
FIG. 4 is a block diagram illustrating a computer and peripherals adapted to implement the recording and search method according to the invention.

The recording device and search device as described above are incorporated in a microprocessor 500 of a computer 16 as illustrated in FIG. 4.

Naturally, the recording device and search device could in practice be incorporated in distinct computers 16.

A read only memory ROM 501 contains a program for recording information and a program for searching for documents in the history of the user.

A random access memory RAM 502 contains registers adapted to record variables modified during the running of these programs.

In particular, this random access memory 502 can contain the registers 21 and 22 of the dictionary 10 for storing the binary codes and the associated key words, the different registers of the history 2, and notably the registers 31, 32, 33 for storing the electronic addresses of the documents visited, the list of codes and the CRC authentication signature.

The read only memory 501 can contain data stored for implementing the programs, and notably a threshold value for the means 18 of filtering the documents extracted from the history 2, the lists of commands, words or known terminations which can be used as described below for eliminating from a document all the non-significant terms in order to extract the key words therefrom.

The computer 16 can be connected to different peripherals, for example a digital camera 800 or a microphone 601, headphones 602 or a loudspeaker 600 by means of an input/output card 511 in order to receive and store documents.

This computer 16 has a communication interface 510 connected to the communication network 4 in order to receive or send computer requests and transfer or receive documents.

The computer 16 also has document storage means, such as a hard disk 506, or is adapted to cooperate by means of a disk drive 507, a compact disc drive 508 or a computer card reader 509, with removable document storage means, respectively diskettes 700, compact discs 701 (CDs) or computer cards 702 (PC cards).

These fixed or removable storage means can also contain the code of the recording or search method according to the invention which, once read by the microprocessor 500, will be stored in the hard disk 506.

By way of variant, the program enabling the recording or search device to implement the invention can be stored in the read only memory 501.

As a second variant, the program can be received in order to be stored as described above by means of the communication network 4.

The computer 16 also has a screen 503 for serving for example as an interface with an operator by means of the keyboard 504 or mouse 505 or any other means.

The central unit 500 (CPU) will execute the instructions relating to the implementation of the invention. On powering up, the programs and methods related to the invention stored in a non-volatile memory, for example the read only memory 501, are transferred into the random access memory 502, which will then contain the executable code of the invention as well as the variables necessary for implementing the invention.

The communication bus 512 affords communication between the different sub-elements of the computer 16 or connected to it. The representation of the bus 512 is not limitative, and notably the microprocessor 500 is able to communicate instructions to any sub-element directly or via another sub-element.

A description will now be given, with reference to FIGS. 5 to 7, of the information recording method relating to a document visited by the user 16 according to one embodiment of the invention.

In a first step E1, a visited document, in this example a text, is received by the user 16.

A calculation step E2 makes it possible to calculate the authentication signature CRC1 of the visited document 8.

A verification step E3 then makes it possible to verify the existence or not of the electronic address URL of the document visited in the history 2 of the user 16.

In the affirmative, in a step E4, the authentication signature CRC2 stored with the document 8 in the history is read.

A step E5 of comparing the authentication signatures CRC1 and CRC2 makes it possible to know whether the document has been modified since the last visit of the user 16 to this document.

If the two signatures CRC1 and CRC2 are identical, that is to say the document is unchanged, updating steps E6 and E7 respectively update the registers of the history 2, such as the date of the last visit E6 to the document by the user 16 and the number of visits E7 to this document by the user 16.

If the two signatures CRC1 and CRC2 are different or if the document does not exist in the history 2, the main steps of the recording method according to the invention are implemented.

It includes first of all a step E8 of extracting key words associated with the visited document.

These key words can be associated with the document by the creator of the document on the communication network 4 and can for example be stored in the header of the document.

The extraction step E8 then makes it possible to read these key words.

Figure 6:
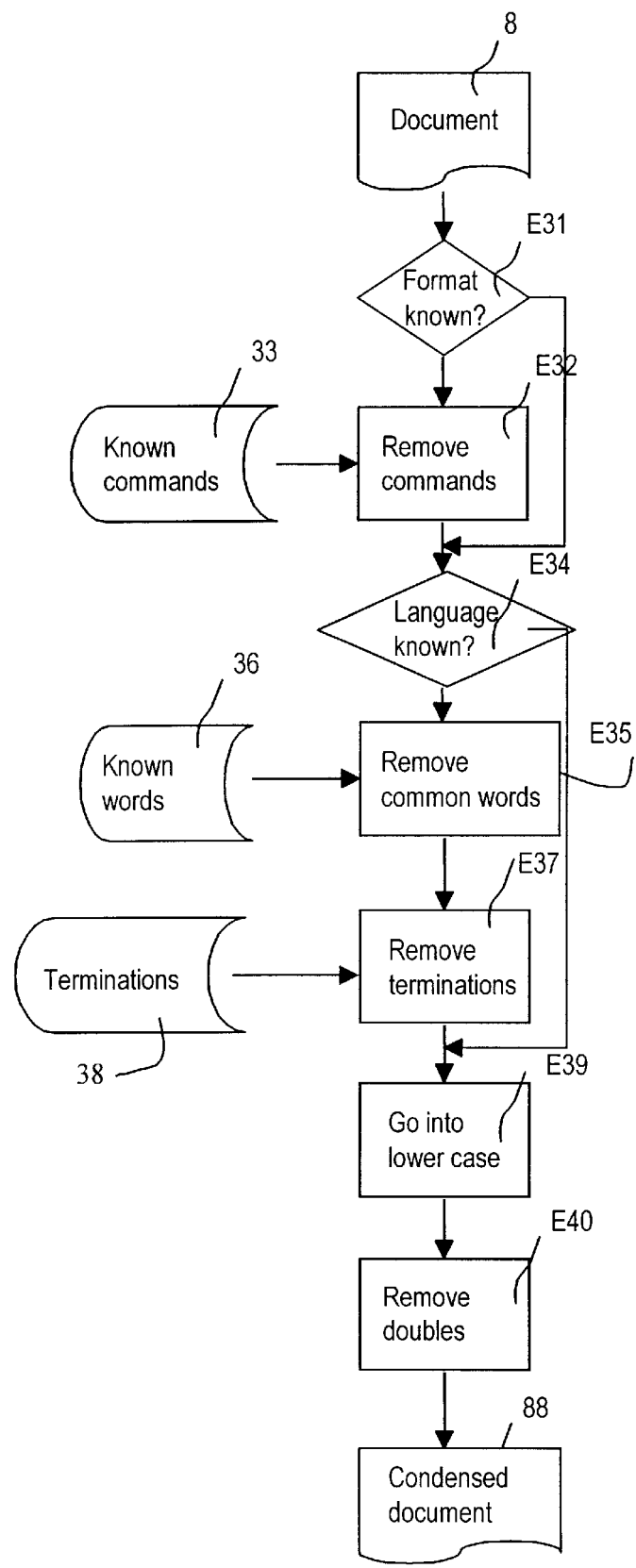
FIG. 6 is an algorithm detailing the step of extracting key words of the recording method according to FIG. 5.

In a preferred embodiment of the invention, the extraction step E8, detailed in FIG. 6, makes it possible to extract, strictly speaking, the key words of the document visited, here referenced document 8.

For this, the step E8 of extracting the key words comprises the following steps:

determining E31 the format of the document 8, for example if it is an HTML format (the standard format of World Wide Web documents), or a PDF (Portable Document Format) from the company Adobe®.

If the format is known, an elimination step E32 eliminates, from the document 8, one or more known commands from a list of commands 33 to be eliminated for a given format.

A test step E34 determines the language of the document 8 and an elimination step E35 eliminates from the document 8 a series of common words from a list of common words 36 to be eliminated for a given language.

An elimination step E37 eliminates from the document 8 a series of terminations from a list of terminations 38 to be eliminated for a given language.

A step E39 of making uniform the writing format of the words of the document 8 makes it possible for example to write all the words in the document 8 in lower case and a step of eliminating doubles E40 in the document 8 makes it possible to obtain a condensed document 88 containing only the significant words of the initial document 8.

The following example gives a better understanding of the functioning of the condenser 7 of the recording device.

Let the following document 8 be in HTML format:
<HTML>
<HEAD>
<META NAME="keyword" CONTENT="poetry, French, mythology" >
<META NAME="date" CONTENT="20/03/1985">
<SCRIPT LANGUAGE="JavaScript">
</SCRIPT>
</HEAD>
<BODY>
<H1>Poem</H1>
<FONT SIZE="-1"
<---Start of poem--->
An ancient goddess, in her distant sobbing<BR>
forever removed from mortal destiny<BR>
<IMG SRC="/graphic/goddess.gif">
<---Provisional end of poem--->
</FONT>
</BODY>
</HTML>

The condensed document 88 will be reduced to the following key words: poetry; French; mythology; poem; start; ancient; goddess; distant; sobbing; forever; removed; mortal; destiny; provisional; end.

A compression step E9 associates a binary code with each extracted key word.

Figure 7:
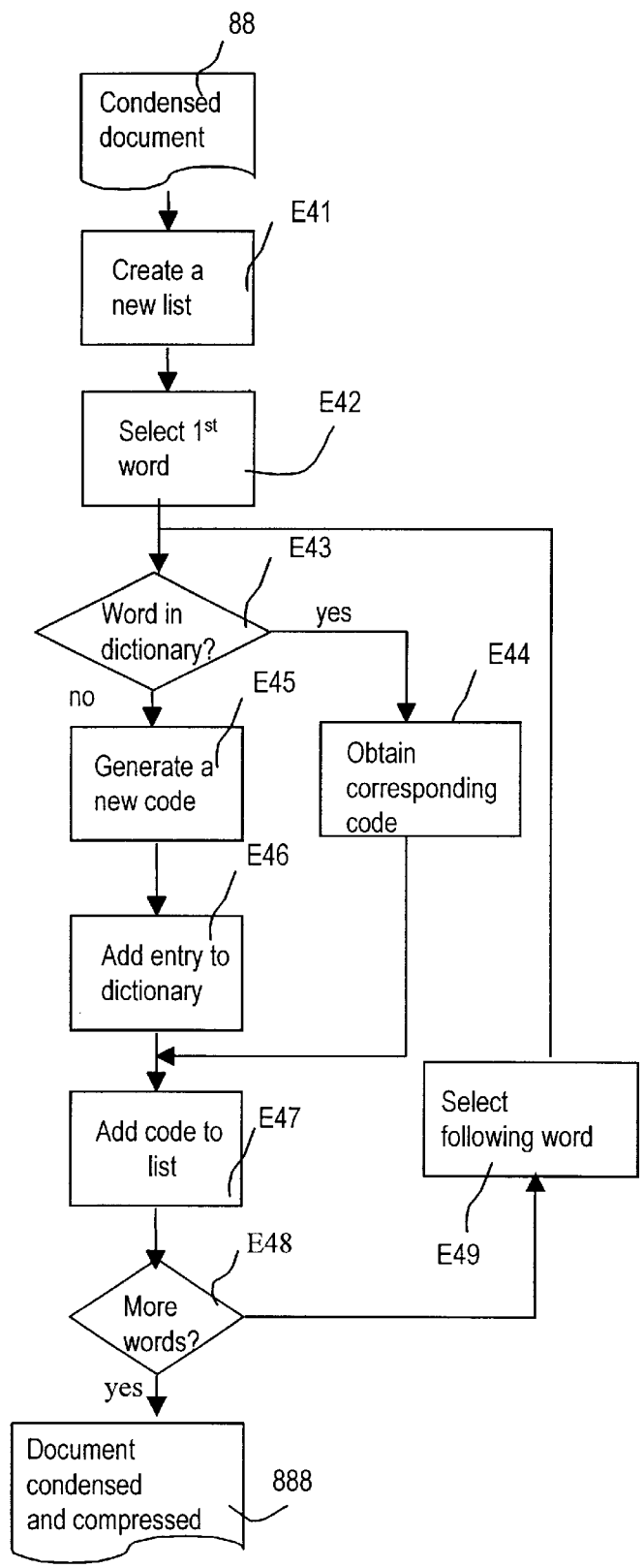
FIG. 7 is an algorithm detailing the storage steps of the recording method according to FIG. 5.

This compression step E9 is detailed in FIG. 7.

From the condensed document 88, an empty list of binary codes is first of all initialised in a step E41.

Next, in a step E42, the first key word of the condensed document 88 is selected.

A verification step E43 verifies whether or not the key word exists in the dictionary 10.

In the affirmative, a reading step E44 makes it possible to obtain the binary code associated with this key word in the dictionary 10.

In the negative, a creation step E45 generates a new binary code.

A storage step E46 makes it possible to add an entry to the dictionary 10 and store a new association of a binary code and a key word.

In this example, the binary codes have a fixed length, equal to M bits for example. At the time of the step E45 of creating a new code, if the number of associations stored in the dictionary 10 is greater than the maximum number $2^M$ of key words which can be coded in M bits, the binary codes of the dictionary are reconstructed on binary codes of length M+1.

There is also added the binary code newly created or simply read in the list associated with the condensed document 88 in a step E47.

At step E48 it is tested whether any unprocessed key words remain in the condensed document 88.

In the affirmative, the following key word is selected at step E49 and the previous steps E43 to 48 are reiterated.

When all the key words have been associated with a binary code, the list thus generated forms a condensed and compressed document 888.

This list is then stored in the history 2 of the user 16.

Figure 5:
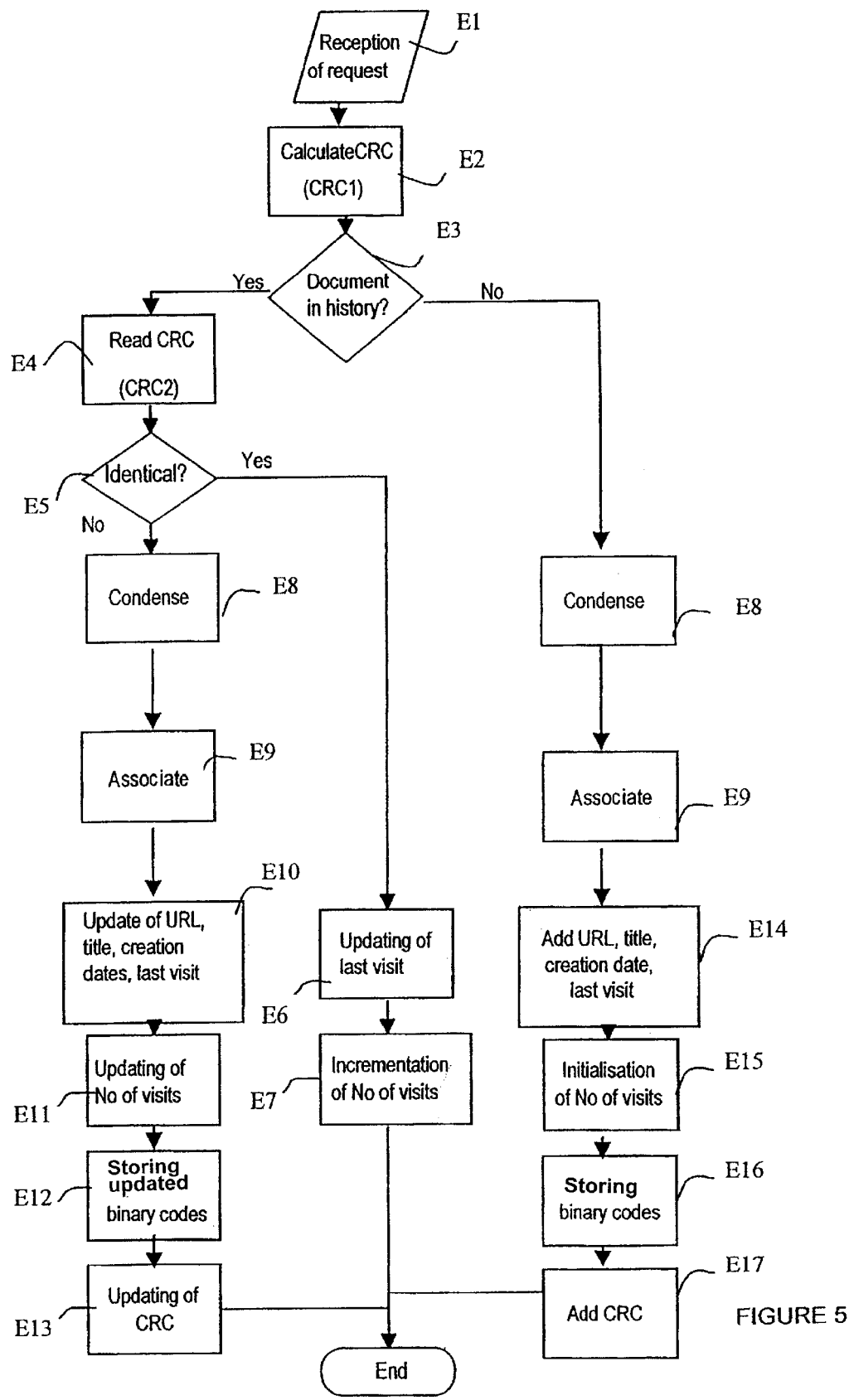
FIGS. 5 and 5A are algorithms of the recording method according to one embodiment of the invention.
Figure 5A:
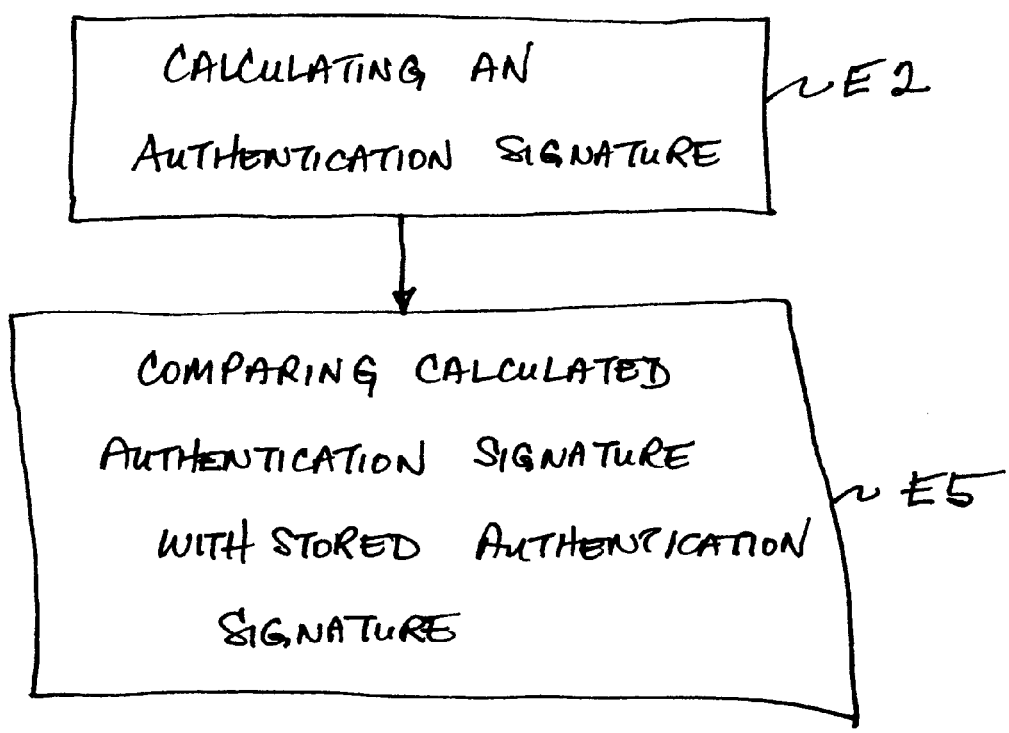

For this, as illustrated in FIG. 5, when the document 8 is already present in the history, the conventional fields of the history 2, such as for example the electronic address URL, the title, the date of creation or last visit of the document, are updated in updating steps E10, E11.

The register 32 of the history 2 is updated in a storage step E12 with the list of binary codes associated with the document 8 and the register 33 of the history 2 in a storage step E13 with the new calculated authentication signature CRC1.

If the document 8 is not present in the history 2, the conventional fields of the history 2, such as for example the electronic address URL of the document 8, its title or its date of creation or last visit to the document 8 by the user 16 are entered in initialisation steps E14 and E15.

In a storage step E16, the list of the binary codes associated with the document 8 is also added in the register 32 of the history 2, and, in a storage step E17, the calculated authentication signature CRC1 is added in the register 33 of the history 2.

The history 2 is thus supplemented each time a document 8 is received by the user 16.

In order to facilitate the subsequent search by binary codes for the documents stored in the history 2, the recording method also includes a step of indexing the electronic addresses URL of the documents by means of the binary codes in a history 2'.

Moreover, in order to reduce the memory space necessary for storing the dictionary 10 in the computer of the user 16, the associations of key words and binary codes stored in the dictionary 10 are compressed by a conventional entropic coding method, for example a Huffman coding.

Each time the user 16 establishes a connection with the communication network 4, the dictionary 10 is decompressed in order to be used as described previously.

Likewise, the different registers of the history 2 can themselves be compressed by conventional methods of coding without loss of data.

Figure 8:
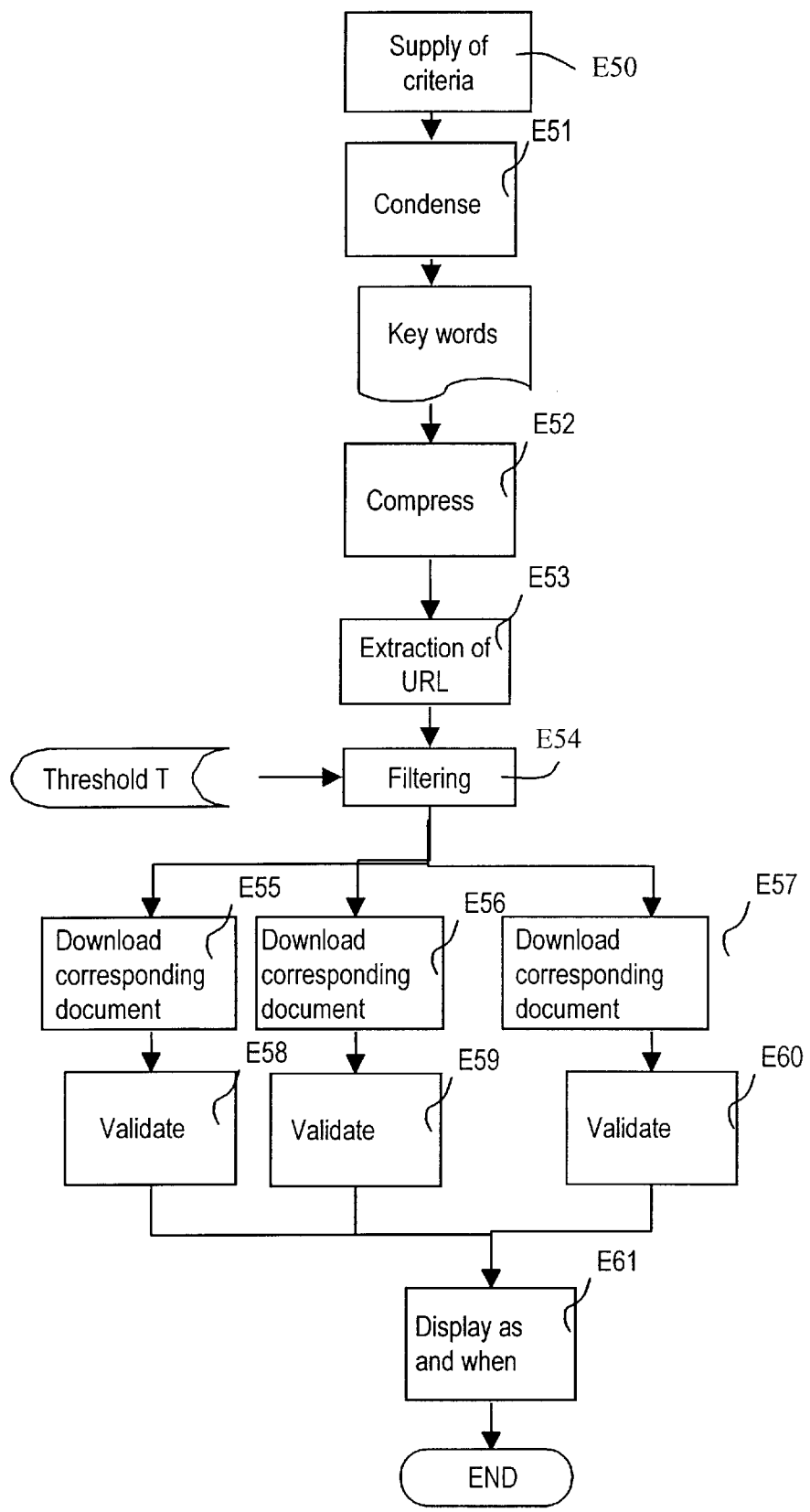
FIG. 8 is an algorithm of the search method according to one embodiment of the invention.

Finally, a description will be given, with reference to FIGS. 8 and 9, of the search method according to the invention which enables a user to find once again a document which he has already visited using information stored in the history 2 as described previously.

This search method includes first of all a step E50 of supplying a search criterion, containing at least one key word, by the user 16. The user attempting to find a document which he has already displayed can thus indicate by key words the subject dealt with by this document.

A step E51 of extracting the key words of this criterion can possibly be implemented in order to retain only the significant words of the criterion. This extraction step is implemented by the condenser 7 in an identical fashion to the extraction step E8 of the recording method described in detail above with reference to FIG. 6.

In this way a list of key words is obtained.

In a conventional manner with regard to searching by key words, the search criterion can comprise a regular expression of key words.

Thus the search can be implemented using truncated key words, possibly linked by a Boolean expression making it possible to link the key words or to exclude certain key words from the search.

For each key word, in a reading step E52, the binary code associated with the key word, if it exists, is read in the dictionary 10.

This reading step E52 is similar to the step of compressing the key words detailed above with reference to FIG. 7, apart from the fact that new binary codes are neither generated nor added in the dictionary if the sought-for key words do not exist.

In this way a list of binary codes is obtained.

Next, in an extraction step E53, the electronic address URL of the document or documents associated with each binary code read is extracted from the history 2, and preferably using the indexed history 2'.

Optionally, the search criterion can include restrictions for searching for documents in the history 2, and for example a restriction in time or only in certain sites of the communication network 4.

When the search criterion contains several key words, a step E54 of filtering the extracted electronic addresses makes it possible to retain only the documents having a minimum number of associated key words.

For example, the number of binary codes read associated with each electronic address URL extracted is compared with a threshold value T and the electronic addresses associated with a number of binary codes less than this threshold value T are eliminated.

Downloading steps E55, E56, E57 make it possible to download, preferably in parallel in order to save time, the documents, here three in number, if they exist.

In practice, and in a conventional fashion on computer communication networks, when the documents are downloaded, a test step makes it possible to verify whether the document sought is stored in a cache memory of the browser 1. In the affirmative, this document is extracted from this cache memory. If not, a computer request is transmitted by the communication network 4 in order to obtain the document from a computer server.

These documents are then displayed gradually in a display step E61, for example on a screen of the computer 16 of the user.

In addition, for each downloading step E55, E56, E57, a validation step E58, E59, E60 is implemented in order to update the history 2, and possibly the dictionary 10, from the received documents.

Figure 9:
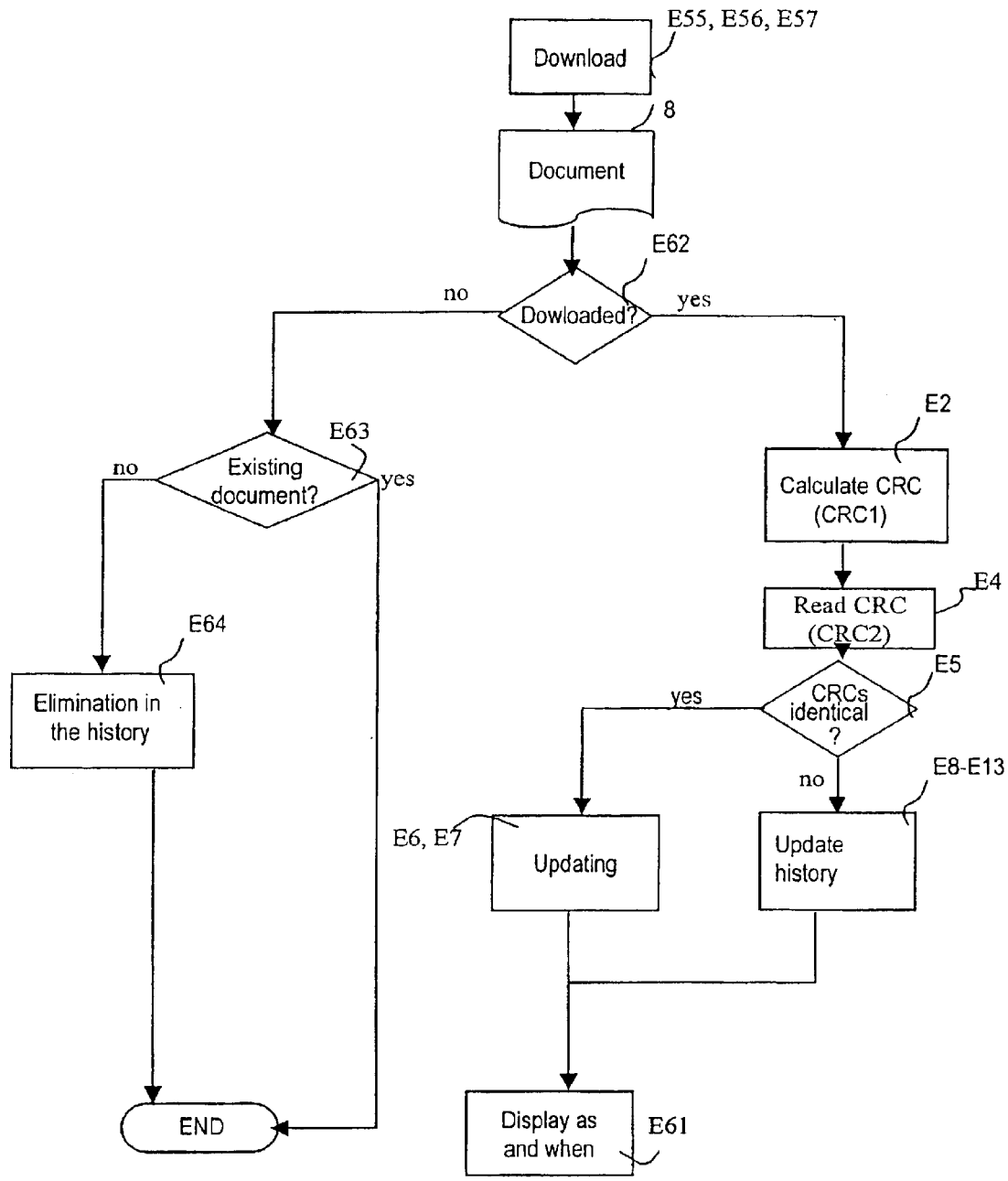
FIG. 9 is an algorithm detailing the step of updating a history of the search method according to FIG. 8.
Figure 5:
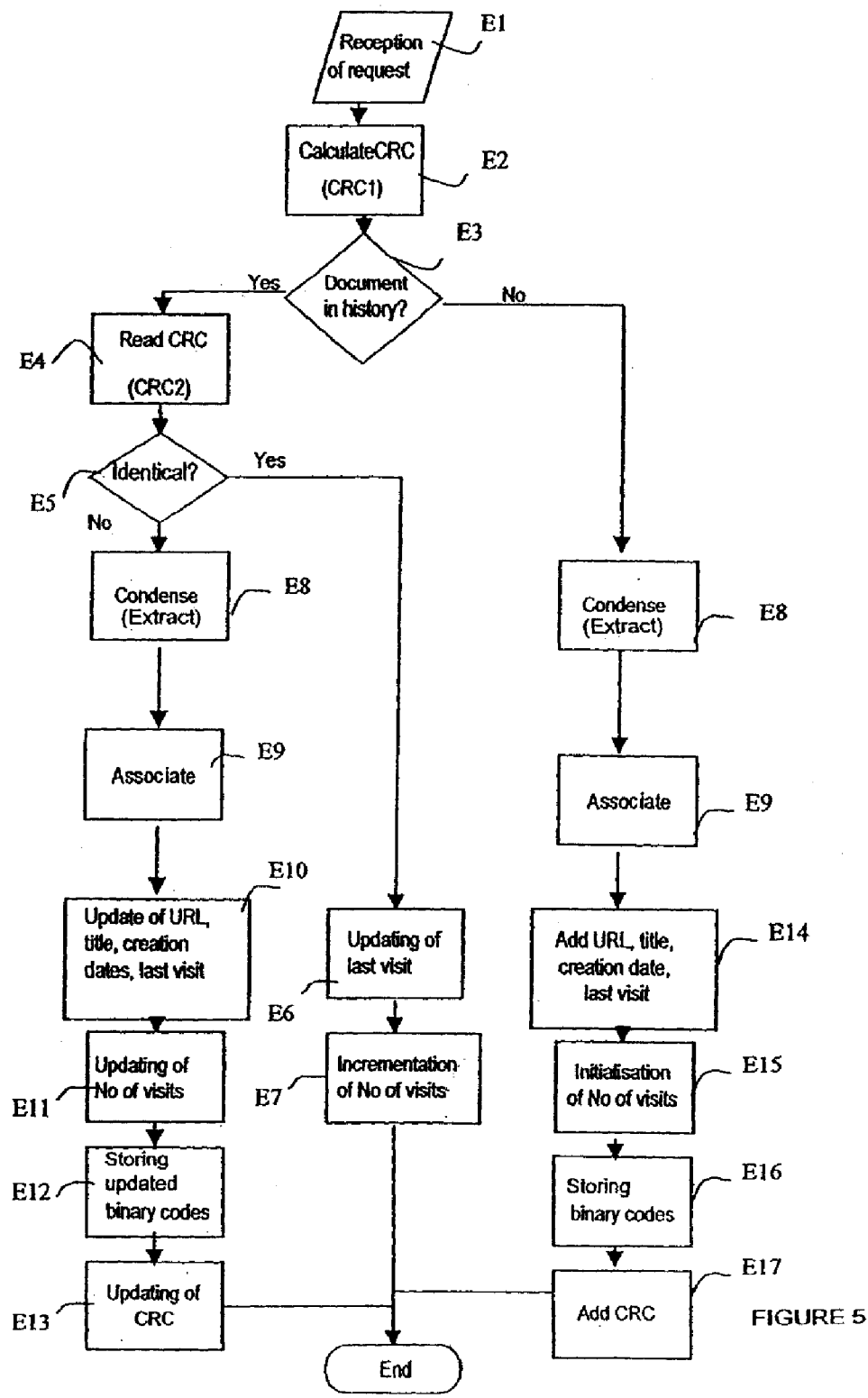

This validation step E58, E59, E60 is illustrated in detail in FIG. 9.

A test step E62 makes it possible to verify whether a document has actually been downloaded.

In the negative, another test step E63 makes it possible to verify whether the requested document still exists on the communication network 4 at the associated electronic address. This test can be implemented for example from the reading of the error message sent by the communication network to the user 16 when no document is downloaded.

If the document no longer exists at this electronic address, a step E64 of eliminating in the history 2 makes it possible to eliminate this document.

If a document 8 is actually downloaded, the authentication signature CRC1 of the document 8 is calculated, as in the recording method as illustrated in FIG. 5, in a calculation step E2.

Next, using this document 8, all the steps E4 to E13 detailed for the recording method are reiterated, apart from the verification E3 of the presence of the document 8 in the history 2, the document 8 being downloaded by the very fact that it exists in the history 2.

Thus, during the search for documents, the documents received also make it possible to update the history 2 of the user.

By virtue of the invention, a method of searching for documents enables the user to find documents again already visited during previous connections without having to effect this search on the entire computer communication network.

What is claimed is:

1. A method of recording information relating to a document accessed by a user (16) of a computer communication network (4), comprising the following steps:
   condensing (E8) the accessed document to obtain key words associated with the accessed document;
   associating (E9) a binary code with each obtained key word to form associations;
   storing (E46) the associations in a dictionary (10); and
   storing (E16) an electronic address (URL) of the accessed document and the binary codes in association with each other in information history storage means (2) of the user (16).

2. A method according to claim 1, wherein the step of associating (E9) a binary code with each obtained key word comprises the following substeps:
   checking (E43) as to whether or not an obtained key word exists in the dictionary (10); and
   if the obtained key word does not exist, creating (E45) a new binay code and associating the new binary code with the obtained key word; or
   if the obtained key word exists, reading (E44) a binary code associated with the obtained key word in the dictionary (10).

3. A method according to one of claims 1 or 2, wherein the binary codes of the dictionary (10) are fixed-length codes.

4. A method according to one of claims 1 or 2, wherein the binary codes are variable-length codes.

5. A method according to claim 2,
   wherein the binary codes have a length of M bits, determined according to a current maximum number $2^M$ of associations stored in the dictionary, such that a size of the dictionary is changeable, and
   wherein in the substep of creating (E45) a new binary code, if a number of associations stored in the dictionary (10) increases to a number greater than $2^M$, the binary codes of the dictionary (10) are reconstructed on binary codes of length M+1 bits.

6. A method according to one of claims 1 or 2, wherein the associations of key words and binary codes stored in the dictionary (10) are compressed by an entropic coding method.

7. A method according to one of claims 1 or 2, wherein the information history storage means (2) is part of a history file (2) associated with a browser (1) of the user (16).

8. A method according to one of claims 1 or 2, further comprising the step of storing (E17), in the information history storage means (2), an authentication signature (CRC2) in association with the electronic address of the accessed document, if the electronic address of the accessed document is not already stored in the information history storage means.

9. A method according to claim 8, further comprising the following steps:
   checking (E3) for an existence or not of the electronic address of the accessed document in the information history storage means (2) of the user (16);
   calculating (E2) an authentication signature (CRC1) associated with the accessed document;
   comparing (E5) the calculated authentication signature (CRC1) and the authentication signature (CRC2) stored in the information history storage means (2); and
   reiterating the steps of condensing (E8) the accessed document to obtain key words, associating (E9) a binary code, storing (E46) the associations, storing (E12) updated binary codes, and storing (E13) the calculated authentication signature (CRC1) in the information history storage means (2) of the user (16) as the updated authentication signature, when the calculated and stored authentication signatures are different.

10. A method according to one of claims 1 or 2, wherein said step of extracting (8) key words comprises the following substeps:
   determining (E31) a format of the accessed document (8);
   eliminating (E32), in the accessed document (8), one or more commands from a list of commands (33) to be eliminated for a given format;
   determining (E34) a language of the accessed document;
   eliminating (E35), in the accessed document, a series of common words from a list of common words (36) to be eliminated for a given language;
   eliminating (E37), in the accessed document, a series of terminations from a list of terminations (38) to be eliminated for a given language;
   making uniform (E39) a format of writing the words of the accessed document; and
   eliminating (E40) duplicates of words in the accessed document.

11. A method according to one of claims 1 or 2, further comprising the step of indexing the electronic address of the accessed document by means of the binary code or codes in the information history storage means (2') of the user (16).

12. A search method of searching for a document on a computer communication network (4) from information recorded by a recording method according to claim 1, wherein said search method comprises the following steps:
   supplying (E50), by a user, a search criterion that includes at least one key word;
   reading (E52), from the dictionary (10), a respective binary code associated with each key word supplied by the user;
   extracting (E53), from the information history storage means (2), an electronic address (URL) of an accessed document associated with each read binary code; and
   downloading (E55, E56, E57) the accessed document or documents.

13. A search method according to claim 12,
wherein the search criterion includes more than one key word,
wherein the step of reading (E52) includes reading, from the dictionary (10), binary codes associated with the key words, and
further comprising the step of filtering (E54) the extracted electronic address or addresses, wherein the step of filtering includes the following substeps:
    comparing a number of the read binary code or codes associated with the extracted electronic address or addresses with a threshold value (T); and
    eliminating an electronic address or addresses associated with a number of the read binary code or codes lower than the threshold value T.

14. A search method according to one of claims 12 or 13, wherein the recording method comprises the steps of:
    storing (E13, E17) an authentication signature (CRC2) associated with each document, and
    updating (E58, E59, E60) the information history storage means (2), wherein the step of updating comprises the following substeps:
        eliminating (E63), in the information history storage means, a document or documents that no longer exist at an associated electronic address or addresses;
        calculating (E2) the authentication signature (CRC1) of the downloaded document or documents;
        comparing (E5) the calculated authentication signature (CRC1) and the authentication signature (CRC2) stored in the information history storage means (2); and
        reiterating the steps of condensing (E8) the accessed document to obtain keywords, associating (E9) a binary code, storing (E46) the associations, storing (E12) updated binary codes, and storing (E13) the calculated authentication signature (CRC1) of the recording method as an updated authentication signature, when the calculated and stored authentication signatures are different.

15. A search method according to one of claims 12 or 13, wherein the search criterion comprises a regular expression of the key word or key words.

16. A device for recording information relating to a document accessed by a user (16) of a computer communication network (4), said device comprising:
    means (7) for extracting key words associated with the accessed document, which is accessed via the computer communication network;
    means (11) for associating a binary code with each extracted key word to form associations;
    a dictionary (10) for storing the associations; and
    information history storage means (2) for storing an electronic address (URL) of the accessed document and the binary codes in association with each other.

17. A device according to claim 16, wherein the means for associating (11) a binary code comprises means for verifying (12) whether or not an obtained key word exists in the dictionary, means for creating (13) a new binary code if the obtained key word does not exist, and means for reading (14) a binary code associated with the obtained key word in the dictionary if the key word exists.

18. A device according to one of claims 16 or 17, wherein the binary codes of the dictionary (10) are fixed-length codes.

19. A device according to one of claims 16 or 17, wherein the binary codes are variable-length codes.

20. A device according to one of claims 16 or 17,
wherein the binary codes have a length of M bits, determined according to a current maximum number $2^M$ of associations stored in the dictionary, such that a size of the dictionary is changeable, and
wherein said means of associating (11) a binary code comprises means for reconstructing (15) the binary codes of the dictionary on binary codes of length M+1 bits, when a number of associations stored in the dictionary increases to a number greater than $2^M$.

21. A device according to one of claims 16 or 17, wherein the associations of key words and binary codes stored in the dictionary (10) are compressed by an entropic coding method.

22. A device according to one of claims 16 or 17, wherein the information history storage means (2) is part of a history file (2) associated with a browser (1) of the user (16).

23. A device according to one of claims 16 or 17, wherein the information history storage means (2) stores an authentication signature (CRC2) associated with the accessed document.

24. A device according to claim 23, further comprising:
    means (36) for checking for an existence or not of the electronic address of the accessed document in the information history storage means (2) of the user (16);
    means (37) for calculating an authentication signature (CRC1) associated with the accessed document;
    means (38) for comparing the calculated authentication signature (CRC1) and the authentication signature (CRC2) stored in the information history storage means (2).

25. A device according to one of claims 16 or 17, wherein the information history storage means (2) comprises means for indexing (34) the electronic address of the accessed document by means of the binary code or codes.

26. A device according to one of claims 16 or 17, wherein the device is incorporated in a microprocessor (500), which includes a read only memory (501) storing a program for recording information and a random access memory (502) with registers adapted to record variables modified during running of the program.

27. A search device for searching, by a user, for a document on a computer communication network using information recorded by a recording device according to claim 16, wherein the search device comprises:
    means (17) for supplying a search criterion, provided by a user, that includes at least one key word;
    means (14) for reading, from the dictionary (10), a respective binary code associated with each key word provided by the user;
    means (3) for extracting, from the information history storage means (2), an electronic address of the accessed document or documents associated with each read binary code; and
    means (3) for downloading the accessed document or documents.

28. A search device according to claim 27,
wherein the search criterion includes more than one key word,
wherein the means for reading (14) reads, from the dictionary (10), binary codes associated with the key words, and
further comprising means for filtering (18) the extracted electronic address or addresses, wherein the means for filtering includes:

means for comparing a number of the read binary code or codes associated with the extracted electronic address or addresses with a threshold value; and means for eliminating an electronic address or addresses associated with a number of the read binary code or codes less than the threshold value.

29. A search device incorporated in a recording device according to claim 23, the search device adapted to search for a document on a computer communication network using information recorded by the recording device, the search device comprising:

means (17) for supplying a search criterion, provided by a user, that includes more than one key word;

means (11) for reading, from the dictionary (10), a respective binary code associated with each key word;

means (3) for extracting, from the information history storage means (2), an electronic address of the accessed document or documents associated with each read binary code;

means (3) for downloading the accessed document or documents;

means for filtering (18) the extracted electronic address or addresses, wherein the means for filtering includes:

means for comparing a number of the read binary code or codes associated with the extracted electronic address or addresses with a threshold value, and means for eliminating an electronic address or addresses associated with a number of the read binary code or codes less than the threshold value; and means for eliminating (39), in the information history storage means, an accessed document or documents that no longer exist at an associated electronic address or addresses.

30. A search device according to one of claims 27 or 28, wherein the search device is incorporated in a microprocessor (500), which includes a read only memory (501) storing a program for searching for documents and a random access memory (502) with registers adapted to record variables modified during running of the program.

31. A computer adapted to implement a recording method according to one of claims 1 or 2.

32. A computer adapted to implement a search method according to one of claims 12 or 13.

33. A computer comprising a recording device according to one of claims 16 or 17.

34. A computer comprising a search device according to one of claims 27 or 28.

35. A computer server adapted to implement a recording method according to one of claims 1 or 2.

36. A computer server adapted to implement a search method according to one of claims 12 or 13.

37. A computer server comprising a recording device according to one of claims 16 or 17.

38. A computer server comprising a search device according to one of claims 27 or 28.

39. A computer communication network adapted to implement a recording method according to one of claims 1 or 2.

40. A computer communication network adapted to implement a search method according to one of claims 12 or 13.

41. A computer communication network comprising a recording device according to one of claims 16 or 17.

42. A computer communication network comprising a search device according to one of claims 27 or 28.

43. A computer communication network comprising a plurality of computer servers according to claim 35.

44. A computer communication network in accordance with claim 43, wherein the communication network is a wide area network.

45. An information storage medium, partially or totally removable, readable by a computer and storing a computer program for implementing a recording method according to one of claims 1 or 2.

46. An information storage medium, partially or totally removable, readable by a computer and storing a computer program for implementing a search method according to one of claims 12 or 13.

47. A computer communication network comprising a plurality of computer servers according to claim 36.

48. A computer communication network comprising a plurality of computer servers according to claim 37.

49. A computer communication network comprising a plurality of computer servers according to claim 38.

50. A method of recording information relating to a document accessed by a user (16) of a computer communication network (4), comprising the following steps:

condensing (E8) the accessed document to obtain key words associated with the accessed document;

associating (E9) a binary code with each extracted key word to form associations;

updating binary codes associated with the accessed document when the contents of the accessed document have been modified;

storing (E46) the associations in a dictionary (10); and storing (E12) an electronic address (URL) of the accessed document and updated binary codes in association with each other in information history storage means (2) of the user (16).

51. A method according to claim 50, further comprising the step of storing (E13) an updated authentication signature (CRC1) in association with the electronic address of the accessed document, if the electronic address of the accessed document is already stored in the information history storage means.

52. A device for recording information relating to a document accessed by a user (16) of a computer communication network (4), said device comprising:

means (7) for extracting key words associated with the accessed document, which is accessed via the computer communication network;

means (11) for associating a binary code with each extracted key word to form associations;

a dictionary (10) for storing the associations, means for updating binary codes associated with the accessed document when the contents of the accessed document has been modified; and information history storage means (2) for storing an electronic address (URL) of the accessed document and updated binary codes in association with each other.

* * * * *

UNITED STATES PATENT AND TRADEMARK OFFICE
CERTIFICATE OF CORRECTION

PATENT NO. : 6,832,225 B1
DATED : December 14, 2004
INVENTOR(S) : Félix Henry et al.

It is certified that error appears in the above-identified patent and that said Letters Patent is hereby corrected as shown below:

Drawings,
Sheet 5, Figure 5, replace Figure 5 with attached Replacement Figure 5.

Column 2,
Line 33, "take" should read -- to take --.

Column 6,
Line 23, "such a" should read -- such as a --.

Column 7,
Line 36, "history 20" should read -- history 2 --.

Column 13,
Line 45, "binay" should read -- binary --.

Column 16,
Line 27, "document;" should read -- document; and --.

Signed and Sealed this

Twenty-eighth Day of June, 2005

JON W. DUDAS
*Director of the United States Patent and Trademark Office*